United States Patent [19]

Kubicek

[11] 4,157,929
[45] Jun. 12, 1979

[54] METHOD OF MAKING A POROUS DIMENSIONALLY STABLE HEAT-RESISTANT AND CORROSION-RESISTANT PLATE-LIKE STRUCTURE

[75] Inventor: Vladimir Kubicek, Seuzach, Switzerland

[73] Assignee: Sulzer Brothers Limited, Winterthur, Switzerland

[21] Appl. No.: 804,437

[22] Filed: Jun. 7, 1977

[30] Foreign Application Priority Data

Jun. 17, 1976 [CH] Switzerland ........................ 7729/76

[51] Int. Cl.$^2$ ...................... C03B 29/00; B01D 39/06
[52] U.S. Cl. .................................... 156/89; 55/523; 65/44; 156/182; 156/205; 156/210; 156/280; 165/166; 165/DIG. 8; 210/507; 252/477 R; 428/184; 428/325
[58] Field of Search ............... 428/210, 538, 920, 241, 428/325, 186, 187, 184; 156/210, 290, 292, 89, 182, 280, 205, 207, 208; 252/477 R; 210/509, 507; 23/288 F, 288 PC; 427/376 A; 165/DIG. 8, 166; 55/523; 65/44, 36

[56] References Cited

U.S. PATENT DOCUMENTS

| 3,112,184 | 11/1963 | Hollenbach | 165/DIG. 8 |
| 3,189,563 | 6/1965 | Hauel | 252/477 R |
| 3,949,109 | 4/1976 | McBride | 428/325 |
| 3,982,981 | 9/1976 | Takao et al. | 156/89 |
| 3,986,528 | 10/1976 | Green | 428/538 |
| 4,025,462 | 5/1977 | Cleveland | 428/182 |

*Primary Examiner*—Michael W. Ball
*Attorney, Agent, or Firm*—Kenyon & Kenyon

[57] ABSTRACT

The plate-like structure is formed of glass filaments and a solid ceramic skin which envelopes the glass filaments to form a skeleton-like supporting structure. The glass filaments are also fused to each other at intersecting points to impart stability to the structure.

The method of making the structure includes the steps of forming a coating of a ceramic substance which is capable of being fired on a flat structure of glass filaments. Subsequently, the coated structure is fired at a temperature in a range from 600° C. to 1500° C. to form a solid skin of the ceramic substance while causing the glass filaments to fuse together at the intersecting points of contact.

Packings for material and heat exchange processes can be made from the plate-like structures.

3 Claims, 6 Drawing Figures

METHOD OF MAKING A POROUS DIMENSIONALLY STABLE HEAT-RESISTANT AND CORROSION-RESISTANT PLATE-LIKE STRUCTURE

This invention relates to plate-like structures for packings and, more particularly, to a method of making plate-like structures which are dimensionally stable and heat- and corrosion-resistant.

As is known, the requirements of providing porous, dimensionally stable, heat-resistant and corrosion-resistant structures are encountered in a wide range of engineering. For example, in industrial plants, exhaust stacks for hot corrosive gases or vapors are frequently provided with exhaust hoods which must be corrosion-resistant to the corrosive substances contained in the exhaust gases, e.g. sulphuric acid vapors, as well as heat-resistant as the exhaust vapors frequently have high temperatures of 1000° C. or more. In addition, various types of filters which are used in industrial plants require similar characteristics.

Packings for mass exchange and heat exchange processes also require structures with similar characteristics. At the present time, many packings are made of a fabric or netting of metal wires while other packings are made of asbestos or plastic. Generally, the packings made of a metal fabric or a metal netting use wires with a small diameter. These wires, which usually consist of steel, however, are not corrosion-resistant to a large number of substances to be treated. While asbestos packings are resistant to a relatively large number of substances, such packings require relatively large wall thicknesses because of the brittle nature of asbestos. This imparts a great deal of weight to the packing and, for a given diameter, effects a reduction in the free gap volume. This reduction, in turn, results in a larger pressure drop in the packing.

In the case of plastic packings, these have a disadvantage in that the packings can only be used up to a limited temperature. This reduces the application of the packings to a great extent.

It has also been proposed to construct a packing with asbestos paper layers treated with a non-shrinking synthetic resin such as epoxy resin or phenolic resin. However, such resins are generally temperature-resistant only to a maximum of 100° C. For this reason alone, the packing can only be used for a limited number of processes.

Still other packings have been known which are made exclusively of ceramic. Although these packings are dimensionally stable and corrosion-heat resistant, these packings have certain disadvantages. That is, in order to be dimensionally stable, the packings require relatively thick walls, e.g. in the order of several millimeters. As a result, in addition to requiring a relatively great amount of material, the pressure drop of such packings is very large in material and heat exchange columns due to a relatively small gap volume.

Still further, one other known packing which does exhibit good liquid distribution over the entire cross-section consists of corrugated laminations of a textile or glass fiber fabric or netting which is stiffened by spaced apart metal wires in order to obtain dimensional stability. However, the metal wires have a detrimental effect as only small diameters can be used for manufacturing reasons. As a result, these wires can be easily destroyed by corrosion.

Finally, it is known to make packings of glass fiber fabric, nettings or fleece. Generally, in making these packings, the glass fibers of the base material are coated with a binder which contains at least one glass-forming component, the binder serving to join the individual glass fibers to each other. However, a significant disadvantage of the resultant packing is that the individual fiber bundles of which the layers of the packing are formed consist of a multiplicity of very thin filaments of about 5 to 20 millimicrons with an extremely thin coating of only a few millimicrons. For this reason, the alkyl substances of the layers readily dissolve in many material exchange processes to leave only the lattice structure of silicone oxides. This occurs particularly in the treatment of strong acids such as concentrated hydrochloric acid. As a result, the self-supporting structure of the layers is destroyed in a relatively short time. Consequently, the use of such packings is severely limited. For example, these packings are generally only useful for processing weakly corrosive media, or if highly corrosive media are processed, this can be done in only very small quantities such as might occur in the processing of chlorinated organic products in which there is a slight separation of hydrochloric acid.

Accordingly, it is an object of this invention to provide a method of economically producing porous, dimensionally stable, heat-resistant and corrosion-resistant structures of glass fibers.

It is another object of the invention to provide a porous, dimensionally stable heat and corrosion resistant structure which is capable of use in a packing for material exchange and heat exchange processes.

It is another object of the invention to provide a relatively simple method of making packing elements for corrosive processes.

Briefly, the invention provides a method of making a porous dimensionally stable heat-resistant and corrosion-resistant plate-like structure. The method comprises the steps of obtaining a flat structure of glass filaments wherein the glass filaments are disposed in intersecting relation. Thereafter, a coating of a ceramic substance which is capable of being fired is formed on the flat structure of glass filaments and, subsequently, the coating is fired at a temperature sufficient to form a solid skin of the ceramic substance. This skin envelopes the glass filaments and defines a skeleton-like supporting structure for the glass filaments. In addition, during firing, the temperature is at least in the range of the melting temperature of the glass filaments so as to cause the glass filaments to fuse together at intersecting points of contact.

In accordance with the method, the flat structure is shaped after the coating step and prior to the firing step. In this regard, the structure can be shaped into a corrugated plate-like structure.

In order to effect the coating of the ceramic substance, a binder is applied to the glass filament structure prior to coating. The flat structure may then be shaped after application of the binder since the binder stiffens the structure to some degree.

The plate-like structure provided by the invention thus comprises a plurality of glass filaments which are disposed in intersecting relation with the filaments fused together at intersecting points of contact and a solid ceramic skin enveloping the glass filaments to form a skeleton-like supporting structure. The structure may remain in a flat shape or be shaped into a corrugated shape. Further, the glass filaments may be in the form of glass fiber bundles while the structure may be in the form of an open mesh fabric, a knitted fabric or a fleece. In addition, the ceramic skin may be porous.

Where the filaments are made as glass fiber bundles, the fibers of the individual bundles can also be fused together during the melting process.

The invention further provides a porous packing for material and heat exchange processes which is made up of a plurality of laminations each of which is composed of a corrugated plate-like structure formed as described above.

These and other objects and advantages of the invention will become more apparent from the following detailed description and appended claims taken in conjunction with the accompanying drawings in which:

Figure 1:
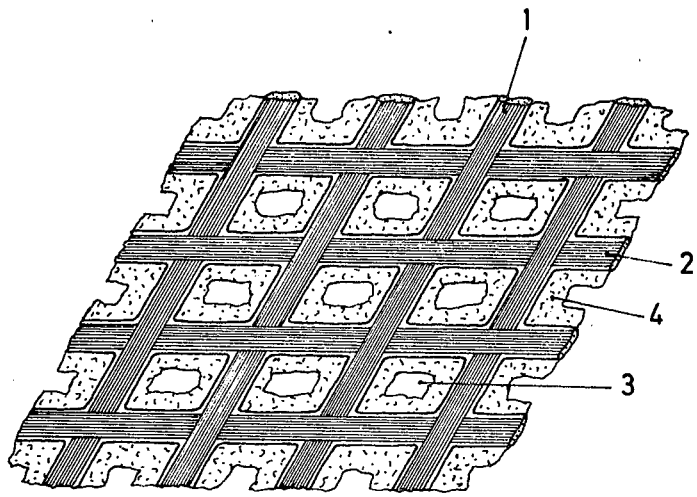
FIG. 1 illustrates a schematic perspective view of a part of a plate-like structure in accordance with the invention.

Referring to FIG. 1, the plate-like structure is of flat shape and is composed of a plurality of glass filaments 1, 2 disposed in intersecting relation. As shown, these glass filaments 1, 2 are disposed in the form of an open mesh fabric with each of the filaments 1, 2 being formed of glass fiber bundles. In addition, the structure has a solid ceramic skin 4 enveloping the glass filaments 1, 2 to form a skeleton-like supporting structure with open meshes 3.

Figure 2:
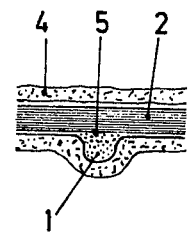
FIG. 2 illustrates a cross-sectional view of a segment of the structure of FIG. 1.

Referring to FIG. 2, as shown, the fibers of the individual bundles 1, 2 are fused together at least to a large extent at the intersecting points of contact 5 so that dimensional stability of the structure is ensured.

Figure 3:
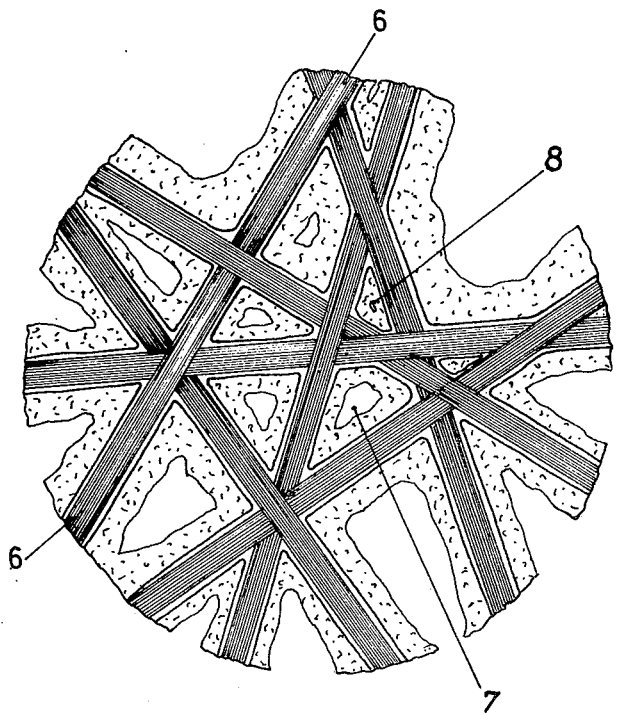
FIG. 3 illustrates a schematic perspective view of a structure in accordance with the invention made from a fleece.

Referring to FIG. 3, the plate-like structure may alternatively be formed of a fleece made up of intersecting glass filaments 6 with a ceramic skin 8 enveloping the filaments 6 while defining open meshes 7.

Figure 4:
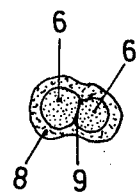
FIG. 4 illustrates a cross-sectional view of a segment of the fleece of FIG. 3.

Referring to FIG. 4, the filaments 6 of the fleece are fused together at their respective points of contact 9, i.e. the filaments are welded together.

In order to make the structure of FIG. 1, the following steps are carried out. First, a flat structure of glass filaments 1, 2 is obtained wherein the filaments 1, 2 are disposed in intersecting relation in the manner of an open mesh fabric. The glass filaments are then impregnated with a binder such as a colloidal silicic acid, or are wetted with an ionotropic sol, Al(NO$_3$)$_3$, 9H$_2$O, alcohol, lactic acid aluminum salt and tetraethoxy silane. Thereafter, the structure is dried and during the drying subjected to a desired shaping process for example, the structure may be shaped into a corrugated form. Next, the structure is immersed in a solution made into a paste with a ceramic powder. During this dipping process the impregnated glass filaments support the skin of ceramic material. The solution may consist, for instance, of alcohol, ethyl silicate and aqueous hydrochloric acid. The ceramic powder may be a silicate such as a quartz powder, silicates with oxides of other elements such as sodium, calcium, aluminum, boron, magnesium or clays which are found in various compositions and which, through mixing, have different qualities such as zirconium meal, sillimainte, mullite, quartz meal or zirconium silicate.

Thereafter, the coated structure is fired in a furnace at a temperature sufficient to form a solid skin of the ceramic substance, for example in a temperature range of from 600° C. to 1500° C. The skin thus envelopes the glass filaments and defines a skeleton-like supporting structure for the filaments during the calcination. The temperature is further at least in the range of the melting temperature of the glass filaments to cause filaments to fuse together at the intersecting points of contact 5 (FIG. 2).

With all of the substances employed in the coating, it is important that the ceramic coating be stabilized, i.e. be stabilized in shape, before the softening point of the filaments is reached.

After the firing step is carried out, a porous dimensionally stable heat-resistant and corrosion-resistant coating is obtained.

It is to be noted that if the coating of the ceramic substance cannot be fired, the form of the flat structure would be destroyed during the melting of the glass filaments. Further, the dimensional stability of the plate-like structure is achieved by fusing, i.e. the melting and welding together of the glass filaments 1, 2 (6) at their points of contact.

The plate-like structure formed of the fleece as shown in FIG. 3 is made in a similar fashion as described above.

Figure 5:
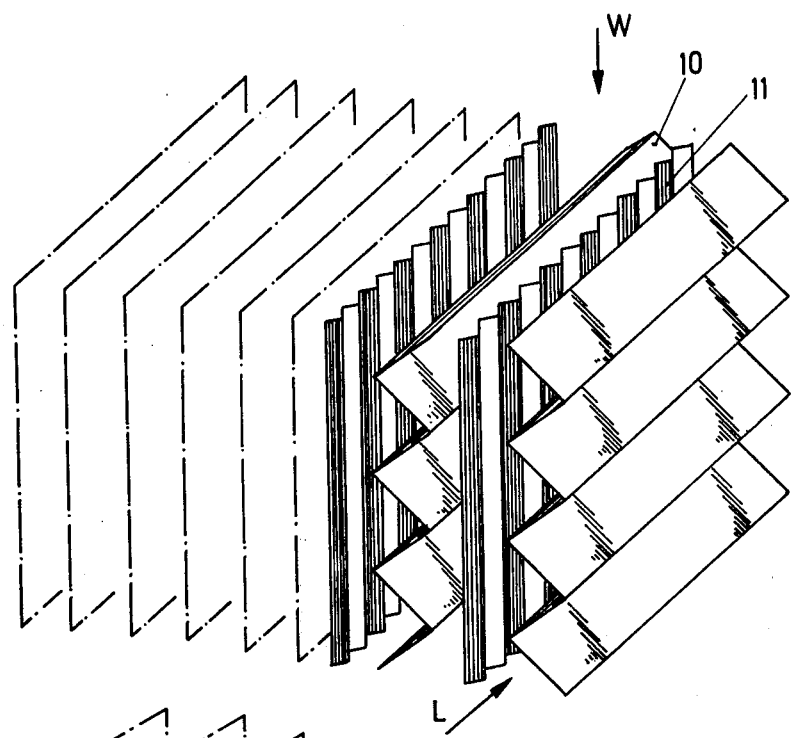
FIG. 5 illustrates a packing formed of plate-like structures made in accordance with the invention.

Referring to FIG. 5, a porous packing for use in a cross-flow heat exchanger can be comprised of a plurality of laminations, each of which is constructed of a plate-like structure as described above. In this case, the individual laminations 10, 11 are each formed of a corrugated plate-like structure with the alternating laminations having horizontal and vertical corrugations. As shown, the corrugations of adjacent laminations touch each other at a multiplicity of points and enclose an angle of about 90°. In addition, each of the laminations defines a plurality of flow paths with the flow paths of one lamination disposed in crossing relation with the flow paths of a facing lamination. The arrow W indicates the flow direction of one medium while the arrow L indicates the flow direction of another medium which is in heat exchange relation with the first medium during operation. As indicated, the packing has a square cross section although the cross section may also be circular or of any other suitable shape.

Each lamination of the packing is made in the manner described above with respect to FIG. 1. Of course, the corrugating of the flat structure is carried out by a shaping step prior to the step of firing the coating on the plate-like structure.

Figure 6:
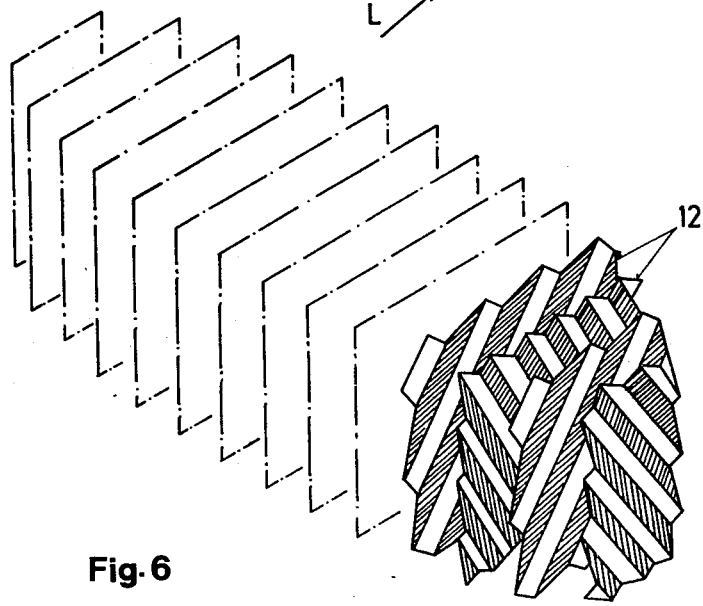
FIG. 6 illustrates a packing for a material exchange column of cylindrical cross-section made up of laminations of plate-like structures in accordance with the invention.

Referring to FIG. 6, a packing for a material exchange column such as a rectification column through which a liquid and a gaseous phase are transported in counterflow is made up of a plurality of laminations 12, each of which is composed of a porous dimensionally stable heat-resistant and corrosion-resistant corrugated plate-like structure as described above. As shown, the laminations 12 are in the order in which they are stacked up sequentially and then placed in the material exchange part of a cylindrical column. The different lamination sizes of the individual parts increases from the two outer sides towards the center in such a way that, after assembly, the laminations define a cylindrical body. Of the individual laminations, only four are shown exactly while the others are shown schematically.

As illustrated in FIG. 6, the corrugations of the adjacent laminations 12 are oriented so that the edges of each two adjacent laminations intersect. Further, the flow paths defined by each lamination 12 are disposed in crossing relation with the flow paths of the facing lamination.

The individual laminations 10, 11 of a heat exchanger according to FIG. 5 or the individual laminations 12 of a packing according to FIG. 6 can, of course, be shaped prior to firing and assembled to form a packing. In this manufacturing method, the individual adjacent laminations are joined together at the point of contact.

It is to be noted that the packings are not limited to the type as shown in FIGS. 5 and 6 but may also include packings of different shape. For example, the packings may be made with a honeycomb-like structure of the flow paths. Further, the individual laminations may be made with a very small thickness, for example, of one millimeter or less. This is extremely advantageous, particularly for material exchange columns such as rectification columns, as such packings have only a relatively small pressure drop. Furthermore, these packings have only a small liquid content (hold up) due to the relatively large free gap volume. Thus, a rapid material exchange can take place between the two media.

Finally, it is to be noted that through an appropriate choice of the grain size of the ceramic substance, for example with diameters in the order of about 50 to 300 millimicrons, a porous coating material can be obtained. This allows a good distribution of the liquid to be effected due to the capillary effect of the coating.

What is claimed is:

1. A method of making a porous dimensionally stable heat-resistant and corrosion-resistant packing of contiguous plate-like structures for mass exchange and heat exchange processes, said method comprising the steps of obtaining a plurality of flat structures of glass filaments with open meshes;

impregnating each structure with a binder capable of stiffening each structure on drying;

thereafter shaping each structure into a corrugated form while drying each structure to stiffen each structure and retain the corrugated form;

assembling the corrugated structures together to form a packing;

immersing the assembled corrugated structures into a ceramic substance to form a coating which is capable of being fired on the corrugated structures; and thereafter firing the coated assembled structures at a temperature sufficient to form a solid skin of the ceramic substance to envelope the glass filaments and to define a skeleton-like supporting structure with each structure defining a plurality of flow paths and with open meshes in each structure, said temperature being at least in the range of the melting temperature of the glass filaments to cause the individual adjacent corrugated structures to fuse together at intersecting points of contact.

2. A method as set forth in claim 1 wherein said temperature is in the range of from 600° C. to 1500° C.

3. A method as set forth in claim 1 wherein each flat structure is corrugated to define a plurality of flow paths disposed in cross relation with the flow paths of a facing structure.

* * * * *

UNITED STATES PATENT AND TRADEMARK OFFICE
CERTIFICATE OF CORRECTION

PATENT NO. : 4,157,929
DATED : June 12, 1979
INVENTOR(S) : Vladimir Kubicek

It is certified that error appears in the above—identified patent and that said Letters Patent is hereby corrected as shown below:

Column 3, line 58 change ", 9" to --·9--

Column 4, line 5, change "sillimainte" to --sillimanite--

Signed and Sealed this

First Day of July 1980

[SEAL]

Attest:

SIDNEY A. DIAMOND

Attesting Officer      Commissioner of Patents and Trademarks